United States Patent
McDowell

Patent Number: 5,952,968
Date of Patent: Sep. 14, 1999

[54] METHOD AND APPARATUS FOR REDUCING JAMMING BY BEAM FORMING USING NAVIGATIONAL DATA

[75] Inventor: Charles E. McDowell, Cedar Rapids, Iowa

[73] Assignee: Rockwell International Corporation, Costa Mesa, Calif.

[21] Appl. No.: 08/931,104

[22] Filed: Sep. 15, 1997

[51] Int. Cl.[6] .................................................. G01S 3/16
[52] U.S. Cl. .......................................................... 342/383
[58] Field of Search .................................. 342/378, 380, 342/383, 359, 357

[56] References Cited

U.S. PATENT DOCUMENTS

| | | | |
|---|---|---|---|
| 3,646,558 | 2/1972 | Campanella | 342/373 |
| 4,384,293 | 5/1983 | Deem et al. | |
| 4,445,118 | 4/1984 | Taylor et al. | |
| 4,599,620 | 7/1986 | Evans | 342/357 |
| 4,970,523 | 11/1990 | Braisted et al. | 342/418 |
| 4,980,691 | 12/1990 | Rigg et al. | 342/372 |
| 5,107,273 | 4/1992 | Roberts | 342/417 |
| 5,108,334 | 4/1992 | Eschenbach et al. | 455/314 |
| 5,317,322 | 5/1994 | Grobert | 342/378 |
| 5,381,150 | 1/1995 | Hawkins et al. | 342/13 |
| 5,579,016 | 11/1996 | Wolcott et al. | 342/378 |
| 5,627,548 | 5/1997 | Woo et al. | 342/357 |
| 5,678,171 | 10/1997 | Toyama et al. | 342/359 |
| 5,739,788 | 4/1998 | Dybdal et al. | 342/359 |

Primary Examiner—Gregory C. Issing
Attorney, Agent, or Firm—Kyle Eppele; James P. O'Shaughnessy

[57] ABSTRACT

A method of reducing jamming in a global positioning system (GPS) satellite receiving system includes the steps of: a) selecting an initial weight value corresponding to each antenna element; b) selecting a weight adjustment scheme for adjusting the weights; c) measuring a power output from the antenna array; d) obtaining navigational data representing the orientation of the array; e) calculating for a gain of the antenna array corresponding each of the GPS satellites, using the navigational data to provide an indication of the orientation of the array relative to each GPS satellite; f) estimating a power level of a received signal corresponding to each GPS satellite; g) solving for the signal to noise ratio for each GPS satellite, using the estimated power level corresponding to each GPS satellite; h) iteratively and continuously adjusting the weights to obtain a greatest value of the signal to noise ratio; and i) continuously repeating steps (c) through (h).

22 Claims, 14 Drawing Sheets

100 dB J/S 25 dB J/S

50dB J/S 100 dB J/S

2 JAMMERS
100 dB J/S 100 dB J/S

METHOD AND APPARATUS FOR REDUCING JAMMING BY BEAM FORMING USING NAVIGATIONAL DATA

BACKGROUND

The present invention relates generally to techniques for reducing the effects of jamming in radio-frequency receivers and more specifically to methods and apparatus for enhancing the reception of global positioning system (GPS) signals in the presence of jamming signals.

Global position systems, such as the American NAVSTAR GPS and Russian GLONASS, are known. The NAVSTAR GPS developed by the U.S. Department of Defense is a satellite-based radio navigation system which transmits information from which extremely accurate navigational calculations can be made in three-dimensional space anywhere on or near the Earth. Three-dimensional velocity can be determined with similar precision. The GPS uses eighteen to twenty-four satellites that may, for example, be evenly dispersed in three, inclined, twelve hour circular orbits chosen to ensure continuous twenty-four hour coverage world-wide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHz and an L2 signal at a frequency of 1227.6 MHz. The L1 and L2 signals are bi-phase signals modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The ephemeris data is used in conjunction with a set of Keplerian equations to precisely determine the location of each satellite. The receiver measures a phase difference (i.e., time of arrival) of signals from at least four satellites. The time differences are then used to solve a matrix of four equations. The result is a precise determination of the location of the receiver in three-dimensional space. Velocity of the receiver may be determined by a precise measurement of the L1 and L2 frequencies. The measured frequencies are used to determine Doppler frequency shifts caused by differences in velocity. The measured differences are used to solve another set of equations to determine the velocity based upon the Doppler phase shift of the received signal.

GPS signals are very low in amplitude and are transmitted using a spread-spectrum signal bandwidth centered at about 1575.42 MHz. The GPS signals cover a frequency spread of about 20 MHz. GPS receivers are subject to disruption by jammer signals, which may be transmitted either as narrow band signals or broadband signals. Known GPS receiver systems may reduce the affects of narrow band jamming by using frequency-selective filters, such as notch filters, to attenuate the jamming signal. However, broad band jamming signals are more difficult to reduce or eliminate (to "null-out") as the frequency spread of the jamming signals approximates the frequency spread of the GPS signal. However, because the frequency spreading sequence of the GPS signal is encrypted according to a pseudo-random noise code, the jammer cannot be precisely synchronized to the GPS signal. This permits the effects of the jamming signal to be reduced by nulling-out the jamming signal. Further, the signal strength of the jamming signal is typically much greater than the signal strength of the GPS signal and tends to "stick-up" above the GPS signal.

Some known jamming nulling techniques are based on determining an angle of arrival of a signal based on the phase shift of the signal observed at different antenna elements of an antenna array. Various "weights" or "weight values" are assigned to each antenna element and are used to adjust the phase and level of attenuation of the received signal in an attempt to null-out the jammer signal. Power minimization is a known technique that attempts to adjust the weights so as to reduce the total measured power coming from the antenna array. Power minimization techniques rely on the assumption that the jammer signal is much stronger than the GPS signal and that it emanates from a different direction. An array having multiple antenna elements is spatially selective so that a null can be placed in the direction of the jammer by adjusting the weight values. Various known algorithms, such as least mean squares and direct matrix inversion may be used to implement the power minimization technique in digital systems. It is very difficult to use such algorithms in analog systems. In power minimization techniques, it is assumed that almost all of the signal power is due to the jammer component, and not due to the GPS signal, because the GPS signal is very weak and therefore provides no significant power contribution.

In power minimization techniques, weights are used to constrain the signals. However, if the weights associated with each antenna element are allowed to be adjusted to minimize the power level of the received signal, all the weights would eventually be driven to a zero level in an attempt to minimize the overall power, and no signal could thus be obtained. Accordingly, in one example of a known power minimization technique, one of the weights is constrained so that it is equal to one (or some predetermined fixed value) and cannot be adjusted. Therefore, the above-described power minimization technique dictates that less than all of the weights may be adjusted.

In accordance with known power minimization techniques, in one situation, the weights are adjusted according to a predetermined pattern, for example, beginning at some starting point, the gain and the phase are increased or decreased by a predetermined step size. Although not necessarily a random pattern, if the results are beneficial, adjustment to the weights continues in the same direction. This eventually approaches a solution that provides the receiver, such as the GPS receiver, with a somewhat improved signal. However, the improved signal is not optimal. For power minimization techniques, the measure of the improved signal is represented by a signal having the lowest overall power level.

A significant problem associated with power minimization techniques is that it does not make use of information relating to the position of the satellite relative to the receiver or antenna of the receiver. Therefore, nulls may be inadvertently placed in the direction of the satellite, and the desired GPS signal may be adversely degraded. Additionally, power minimization techniques make no attempt to boost gain of the received GPS signal in the direction of the satellites.

Techniques exist to steer gain to desired signal sources. Typically, a set of weights may be selected to steer gain toward a single desired signal source. Because the nature of GPS involves multiple simultaneous desired signal sources, straightforward application of existing techniques implies multiple sets of weights for multiple signal sources. A set of weights means that one weight exists for each antenna element. In other known systems, such as digital GPS systems, each antenna output is sampled and digitized prior to processing. To implement multiple sets of weights, each antenna element is associated with a separate weight, where the set of weights for the antenna array corresponds to one GPS satellite. However, use of multiple weights is very expensive and such systems incur very large hardware burdens. Use of multiple sets of weights would require an additional hardware path for each group of weights corresponding to a specific satellite in such digital systems. Each path would require high-speed hardware, such as multipliers, delay circuits, and filters in addition to high speed processing devices. The same path cannot be used for multiple satellites because processing is not a sequential process and is limited by the processing speed of the hardware associated with each path. Thus, if the same hardware were to be used with multiple sets of weights, for example, four sets of weights, the hardware would need to process signals at four times the rate of hardware dedicated to a single set of weights. Thus, for each set of weights utilized, an additional hardware path with dedicated hardware must be provided. As such, digital systems using multiple sets of weights are hardware intensive and expensive to implement given the current state of technology.

With respect to analog systems, use of multiple sets of weights is prohibitive. To implement multiple hardware paths dictated by the use of multiple sets of weights, the received signal must be "split" and provided to each of multiple processing paths. The cost and complexity of such an analog system renders implementation of multiple sets of weights undesirable. Accordingly, known GPS analog systems are restricted to use of a single set of weights due to size, cost, and complexity considerations. Such systems may inadvertently place spatial nulls in the direction of the satellite, which may degrade system performance.

Accordingly, it is an object of the present invention to provide a novel beam-forming method for reducing jamming to substantially overcome the above-described problems.

It is another object of the present invention to provide a novel technique for reducing jamming that reduces or eliminates placement of spurious nulls on the desired signal.

It is a further object of the present invention to provide a novel technique for reducing jamming in an analog GPS.

It is also an object of the present invention to provide a novel technique for reducing jamming in an analog GPS while simultaneously boosting the gain of the received GPS signal.

It is still an object of the present invention to provide a novel beaming-forming technique in an analog GPS system utilizing a single set of complex weights optimized for multiple satellites.

The disadvantages of present jamming reduction and power minimization techniques are substantially overcome with the present invention by providing a method for reducing jamming by beam forming using spatial nulling.

The present invention is advantageous in analog GPS systems and is based on optimizing the average signal-to-noise ratio (SNR) averaged over the number of satellites tracked. The gain of the GPS signal received is boosted in addition to nulling-out the jammer signal. This is referred to as a "beam-forming" technique. Beam-forming techniques have not been successfully used in analog systems because in order to boost the gain of the received signal, the position of the satellite must be known, and such an implementation would require multiple sets of weights.

In one embodiment of the present invention, beam-forming is accomplished in an analog system using only a single set of weights for the antenna array optimized for the GPS satellites tracked. To accomplish this, positional information with respect to the satellites may be used, for example, in the form of existing navigational data. Many analog GPS systems are based on platforms that include navigational systems (NAV systems), such as inertial navigation systems (INS). The NAV systems provide information with respect to the orientation of the platform or orientation of the antenna relative to the earth. Additionally, information as to the position of the GPS satellite is available via almanac tables, which may be periodically updated.

Using the NAV information, the orientation of the received signal of the satellite may be determined. In many systems, at some point, the location of the GPS receiving system is known, for example, as determined by the NAV system. Thus, for example, if the GPS system becomes temporarily disrupted due to jamming, the NAV system can provide the required positional information.

Accordingly, in one embodiment of the present invention, a method of reducing jamming in a global positioning system (GPS) satellite receiving system includes the steps of: a) selecting an initial weight value corresponding to each antenna element of an antenna array; b) selecting a weight adjustment scheme for adjusting the weights; c) measuring a power output from the antenna array; d) obtaining navigational data representing the orientation of the array; e) calculating a gain of the antenna array corresponding to each of the GPS satellites, using the navigational data to provide an indication of the orientation of the array relative to each GPS satellite; f) estimating or measuring a power level of a received signal corresponding to each GPS satellite; g) solving for a signal to noise ratio for each GPS satellite, using the estimated power level corresponding to each GPS satellite; h) iteratively and continuously adjusting the weights to obtain a greatest value of the signal to noise ratio; and i) continuously repeating steps (c) through (h).

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION OF THE INVENTION

Figure 1:
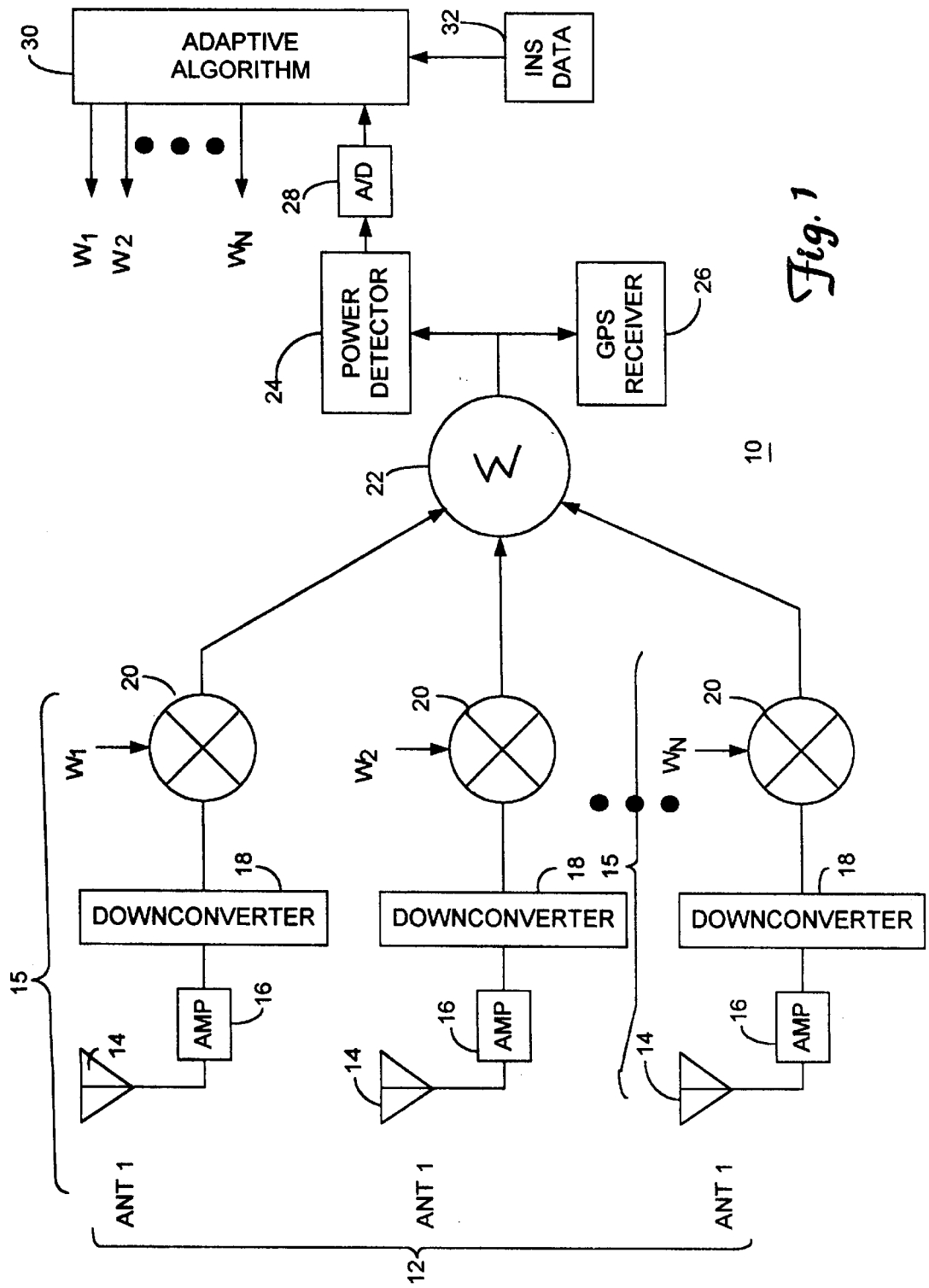
FIG. 1 is a conceptual schematic block diagram of a system configured to implement a specific embodiment of a beam-forming method using navigational data.

Referring now to FIG. 1, a specific embodiment of a GPS receiver system 10 is shown. The system 10 includes an antenna array 12 having plurality of antenna elements 14, where the components comprising each antenna "leg portion" 15 are substantially identical. In the illustrated embodiment, each antenna element 14 is coupled to a front-end amplifier 16, the output of which is supplied to a down-converter 18 to convert the signal to an intermediate frequency for processing. Each down-converted signal is supplied to weighting circuitry or a "weight" 20 that multiplies the signal by a complex weight value (having real and imaginary portions). The outputs of all of the weighting circuits 20 are coupled to a summing circuit 22, as shown. The term "weight," "weight value," and "weighting circuit" are used interchangeably.

In the illustrated embodiment of FIG. 1, the sum of the signals is then coupled to a power detector circuit 24 and is also supplied to a GPS receiver 26. The output of the power detector circuit 24 is then converted to a digital signal by an analog to digital converter 28. The digital signal is then processed by an adaptive algorithm (described hereinafter) under control of a microprocessor or other suitable computer or processor 30. Alternately, dedicated or discrete hardware circuitry may be used in place of the microprocessor 30. In the illustrated embodiment of FIG. 1, the microprocessor 30 adjusts the values of the weight values for each antenna element 14 and iteratively processes the digital signal attempting to constantly improve the signal received by the GPS receiver 26. Additionally, navigational data, such as data provided by an inertial navigation system (INS or NAV system) 32 may be utilized by the adaptive algorithm under control of the microprocessor 30. Typically, a wide-band front-end filter is coupled between the antenna 14 and the amplifier 16. However, its placement may differ from the specific embodiment of FIG. 1, and may not be included in all embodiments.

In the illustrated embodiment of FIG. 1, only a single set of weights 20 is required. One weight 20 corresponds to one antenna element 14. Therefore, the single set of weights corresponds to the array 12 of antenna elements 14, which is optimized for all of the GPS satellites. The NAV system 32 provides information with respect to the position and/or orientation of the receiver (the antenna array of the receiver) which permits the system 10 to solve for the gain of the received GPS signal in the direction of each satellite. In the embodiment of FIG. 1, one set of weights 20 in combination with the NAV data is used to optimize the average signal to noise ratio (SNR). Accordingly, the gain of the received GPS signal is increased.

To perform this optimization of the SNR in the embodiment of FIG. 1, the total power received by the antenna array 12 is divided by the measurement bandwidth to obtain a "noise floor." Using the positional information provided by the NAV system 32, the gain in the direction of the satellite may be obtained. This value can then be used as the criteria for increasing the SNR by adjusting the value of the weights 20 via an adaptive algorithm, such as a "hill climbing" algorithm. Therefore, instead of merely reducing the total power received, as is done in known power minimization techniques, the present invention adjusts the weights 20 to maximize the SNR, meaning that the signal strength of the received GPS signal is boosted, while simultaneously minimizing the jamming signal.

Because each antenna element 14 is part of the antenna array 12, each element has a different carrier phase due to its relative position with respect to each satellite. GPS receiver systems utilizing an antenna array 12 are useful for nulling the effects of broad band jamming signals. In some situations, multiple jammer signals may be present. To null-out "N" number of different jammer signals, "N+1" individual antenna elements 14 are utilized. For example, four antenna elements 14 are used to effectively null-out three jammer signals.

The GPS signal is "buried" in the background noise. One aspect of the present invention utilizes the fact that the GPS signal is extremely weak relative to the strength of the jammer signal. Additionally, the jamming signal typically emanates from a different direction than that of the GPS signal. Often, the GPS signal is transmitted from a satellite that is relatively "high" in sky, while the jamming signal is transmitted from a tower or mobile vehicle located on the ground. Hence, the signals arrive from different directions. Of course, if the jamming signal emanates from an airborne platform and is at the same relative position as that of the satellite, no difference in the angle of arrival between the GPS signal and the jammer signal would be seen, and nulling would be very difficult. However, this is a rare occurrence and would only be temporary.

As described above, the illustrated embodiment of the system 10 of FIG. 1 utilizes a single set of weights 20 for the entire antenna array 12. For each antenna element 14, processing the signal in accordance with the weight 20 causes the phase and/or amplitude of the received signal to be modified in an attempt to "steer" a null in the direction of the jamming signal to reduce its received signal strength, while simultaneously increasing the gain of the received signal in the direction of the GPS satellite.

Figure 2:
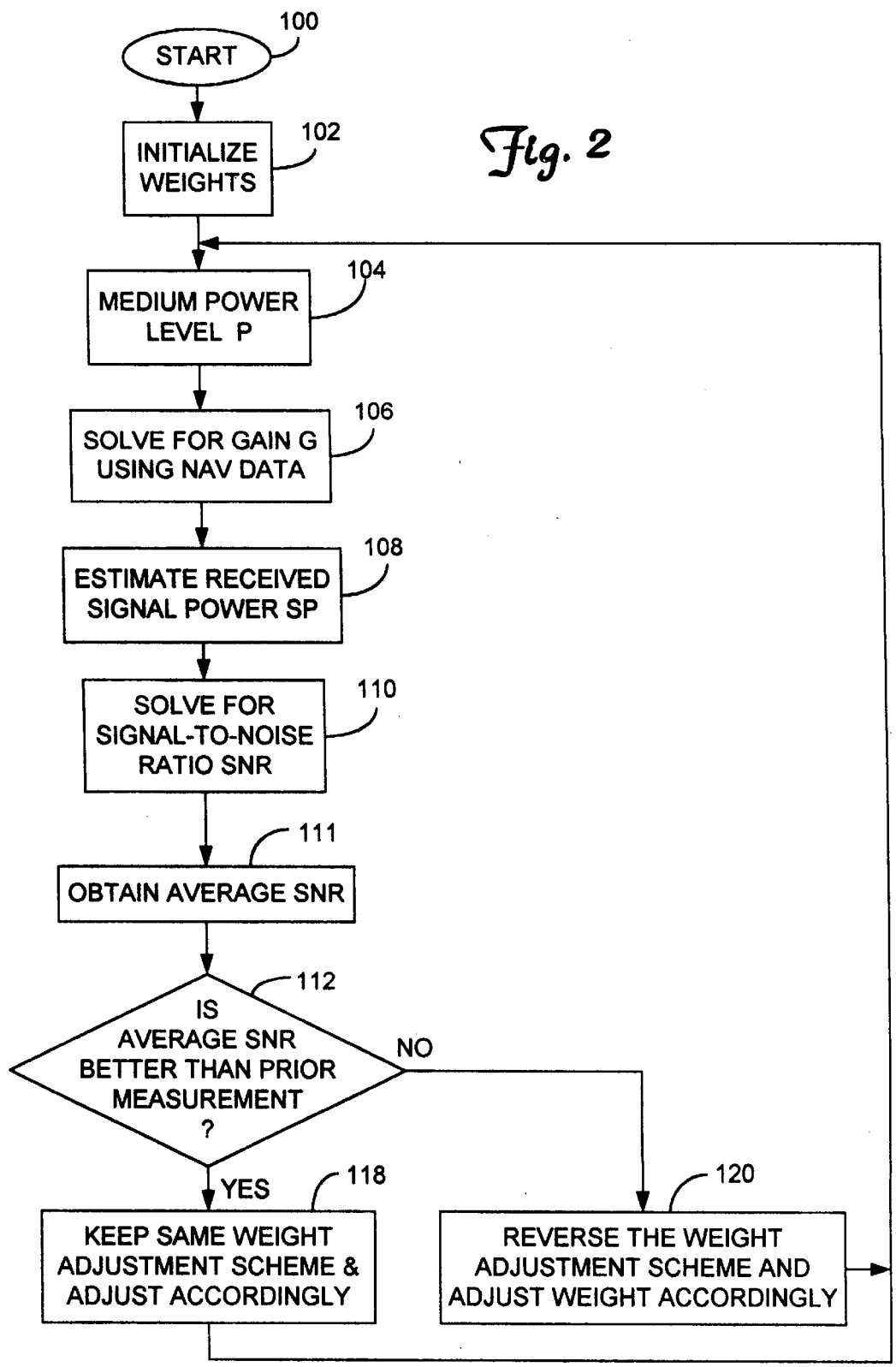
FIG. 2 is a flowchart of a specific embodiment of a beam-forming method using navigational data, according to the present invention.

Referring now to FIG. 2, there is illustrated an example of an implementation of the above-described process for an analog GPS system. The illustrated specific example is generally referred to as a "hill-climbing" method. However, other methods in addition to "hill-climbing" methods may be used (including but not limited to such known techniques as matrix inversion, which may be used in digital GPS systems).

The process begins, as shown at a step 100. First, an initial set of weight values is selected as a starting point, as shown at a step 102. For example, a weight of "1" may be selected which provides no phase shift and no modification in amplitude. Of course, any weight may be used as an initial starting point.

As shown in a step 104, a power level P coming out of the antenna array is measured. This is the measured power contributed by each antenna element as it is modified by whatever weight value is implemented. The output of each antenna element is summed and routed to power detecting circuitry, as is shown in FIG. 1. The power level term P in the illustrated example is preferably divided by the measurement bandwidth BW, for example, a 20 MHz bandwidth. Thus, P/BW provides the "noise floor" term referred to as $N_0$ measured in watts per hertz. This represents a background noise level and includes the transmitted satellite signals in addition to any jammer signals which may be present. The following equation governs:

Equation 1: $P/BW=N_0$

Using the information with respect to the satellite locations and the orientation of the receiving platform supplied by the NAV system, in addition to knowing the value of the weights, the gain G of the antenna array as a whole, in the direction of each satellite is obtained, as shown in a step 106. Accordingly, the gain G of the antenna array as a whole is obtained, as is known in the art using conventional methods.

Next, an estimate of the received satellite signal power SP at the input of the antenna array is calculated, as shown in a step 108. The GPS satellites are known to provide a worst-case signal power level of about −163 dBW on the surface of the earth. However, this level may increase depending upon the elevation of the satellite relative to the receiver (antenna array). Depending upon the elevation angle of the satellite, which is known via the NAV system and almanac data, the satellite signal power SP is estimated. The value of SP may, for example, may range from about −163 dBW to −150 dBW.

Equation 2: SNR $\alpha$ $C/N_0$, where C is the signal power at the output of the antenna array.

Given equation 2 above, and using the estimated satellite power SP, the signal to noise ratio (SNR) corresponding to each satellite is obtained, where (SNR) $\alpha$ ($C/N_0$) and C $\alpha$ (G * SP), as shown in a step 110. The terms are proportional to each other, related by bandwidth. This value is calculated for each satellite because the value of gain G corresponds to a specific satellite. The term "SNR" is used interchangeably with the term "$C/N_0$" although the two terms are not necessarily equal to each other, but rather, proportional to each other.

Given equation 2 above and given equation 3 below:
Equation 3: C $\alpha$ (G * SP);
and solving for the value of SNR yields equation 4 below:
Equation 4: SNR=(G * SP)/$N_0$.

Next, as shown in a step 111, the average SNR is calculated by summing the calculated SNR values for each satellite and dividing the total by the number of satellites. In a step 112, the average SNR is compared to the previous average SNR value found, assuming that the above process has been iteratively repeated. Of course, in the first iteration of the above-described steps, no prior average SNR value will exist. The goal is to adjust the weights to obtain the highest value of the average SNR. The weights are adjusted according to a predetermined pattern to obtain the best possible value of the average SNR. If the present adjustment to the weight value causes an improvement in the average SNR value relative to the previous weight values, then adjustment of the weight value continues in that direction according to the predetermined pattern, as shown in a step 118. If the present adjustment to the weight value causes an degradation in the average SNR value relative to the previous weight value, then adjustment of the weight proceeds in the opposite direction with the same weight, as shown in a step 120. Alternately, rather than proceeding in the opposite direction as shown in the step 120, the next weight may be selected for adjustment. This process is repeated so that all weight values are optimized.

The process branches back to the step 104 so that the steps 104 through 120 are continuously repeated to obtain the best possible average SNR values. The processes shown in the steps 118 and 120 where the weight adjustment "scheme" is adjusted may be implemented, for example, by using a coarse step adjustment followed by a fine step adjustment. In this approach, adjustment of the weight is initially performed using a coarse step size to obtain the best possible SNR measurement of all of the possible coarse steps available. Once the best coarse step is obtained, fine tuning may be performed using small step sizes within the coarse step. This prevents "falling" into a localized minimum or maximum.

Referring now to FIGS. 3–12 the histograms show comparisons of the signal to noise ratio ($C/N_0$) for a specific satellite geometry that includes for example, four satellites and two jammers. With respect to calculating the data points comprising the histograms, the following assumptions have been made:

1. All jammers are narrow band.
2. Two jammers always exist.
3. The antenna array is composed of omni-directional antenna elements.
4. The sum of the thermal noise and the antenna noise at each element is equal to −202 dBW/Hz.
5. The signal strength of the GPS received signal is −163 dBW.
6. The spacing between antenna elements is 0.25 wavelength.
7. The antenna array is composed of seven antenna elements.
8. The satellites and the jammers are placed randomly over a +/−86° angle in azimuth and elevation.
9. The antenna array is perfectly calibrated and the estimates of received signals are perfectly accurate.

Figure 3:
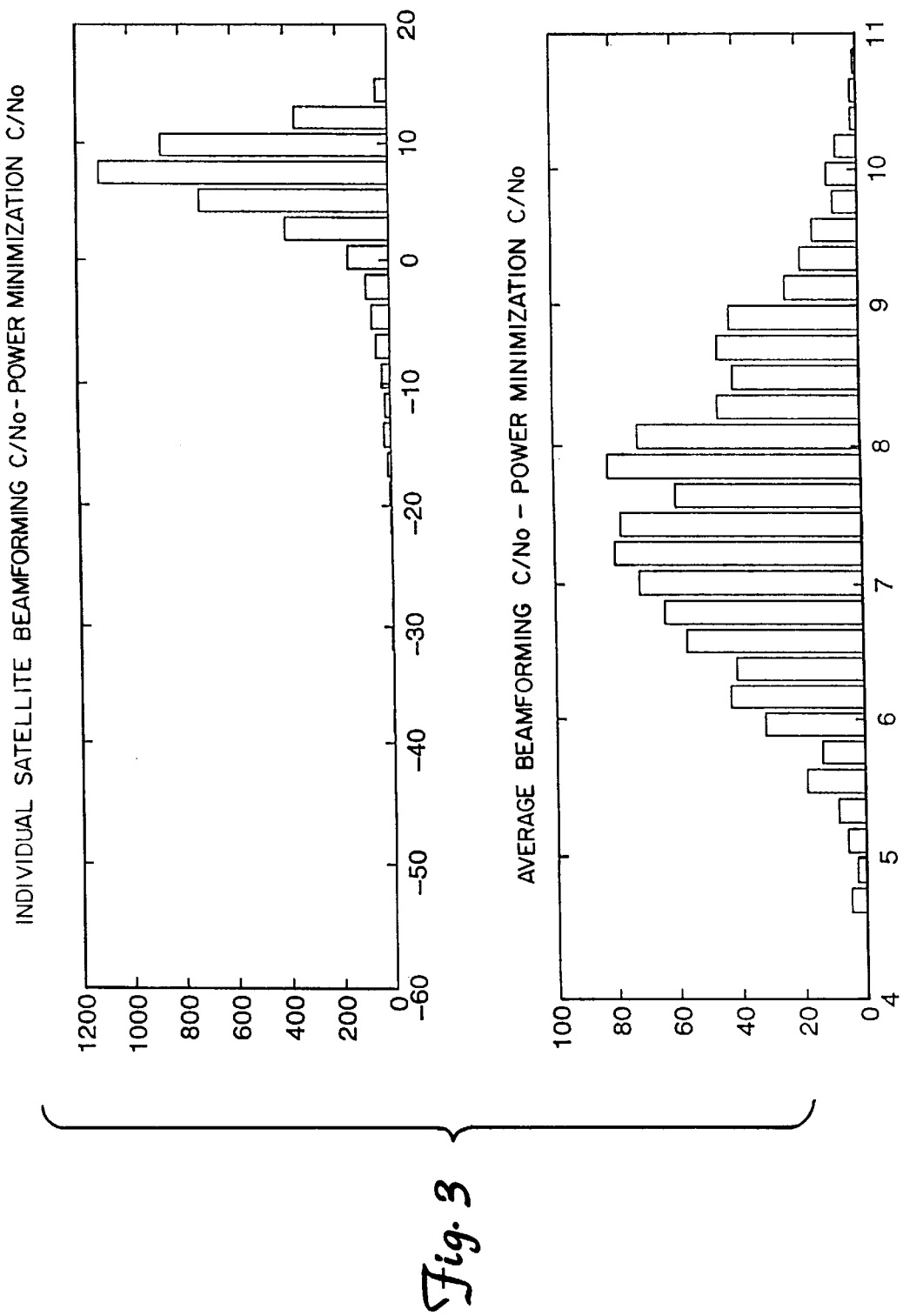
FIGS. 3—5 are histograms where the upper frame of each figure depicts an improvement in the signal-to-noise ratio ($C/N_o$) using one embodiment of the present inventive method obtained on a satellite by satellite basis, compared to the signal-to-noise ratio obtained using known power minimization techniques. The lower frame of each figure depicts the signal-to-noise ratio using an embodiment of the present inventive method obtained as the average of four satellites, compared to the signal-to-noise ratio obtained using known power minimization techniques. The jammer-to-signal (J/S) ratio in FIGS. 3, 4, and 5 is 25 dB, 50 dB, and 100 dB, respectively, using two jammers.
Figure 4:
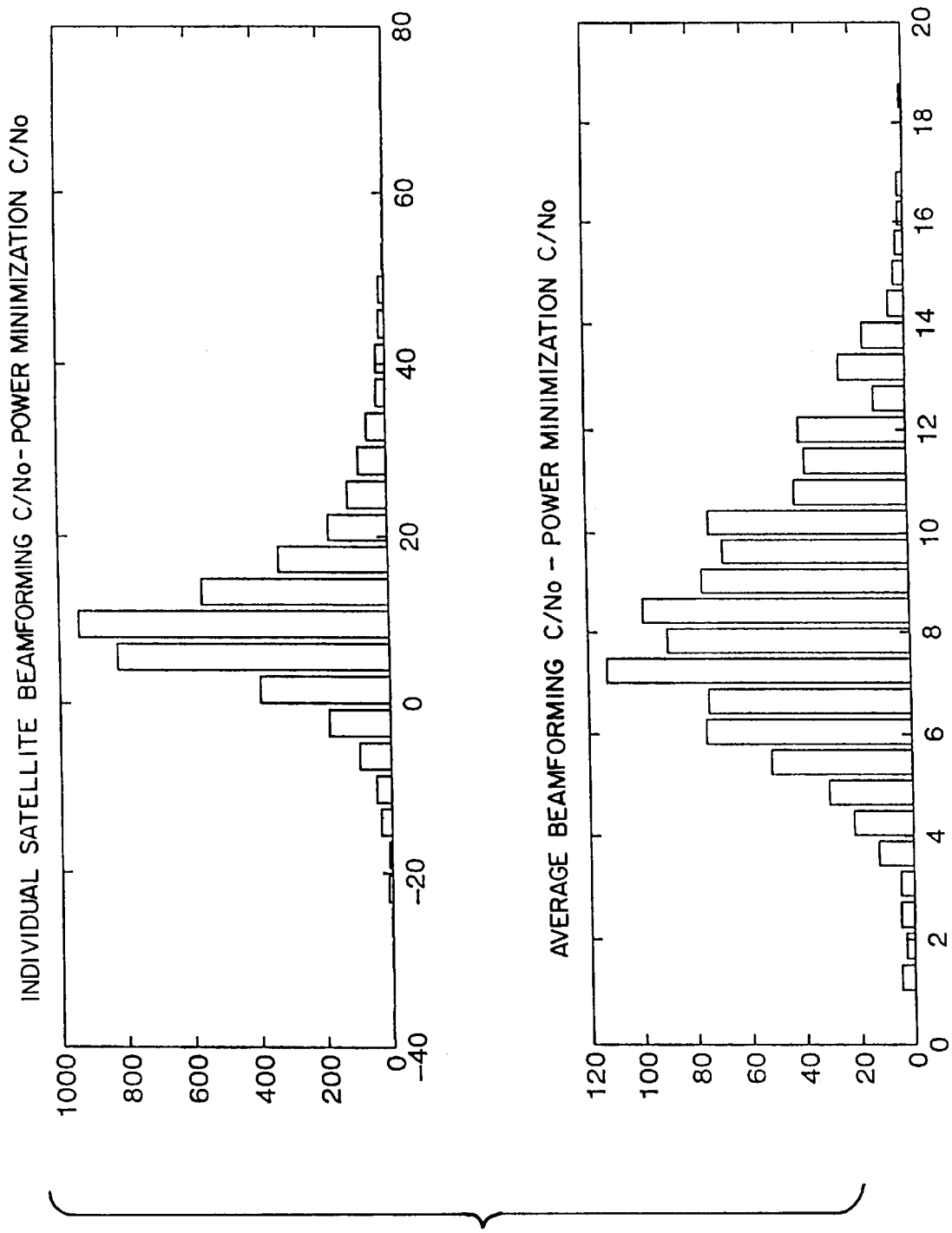
Figure 5:
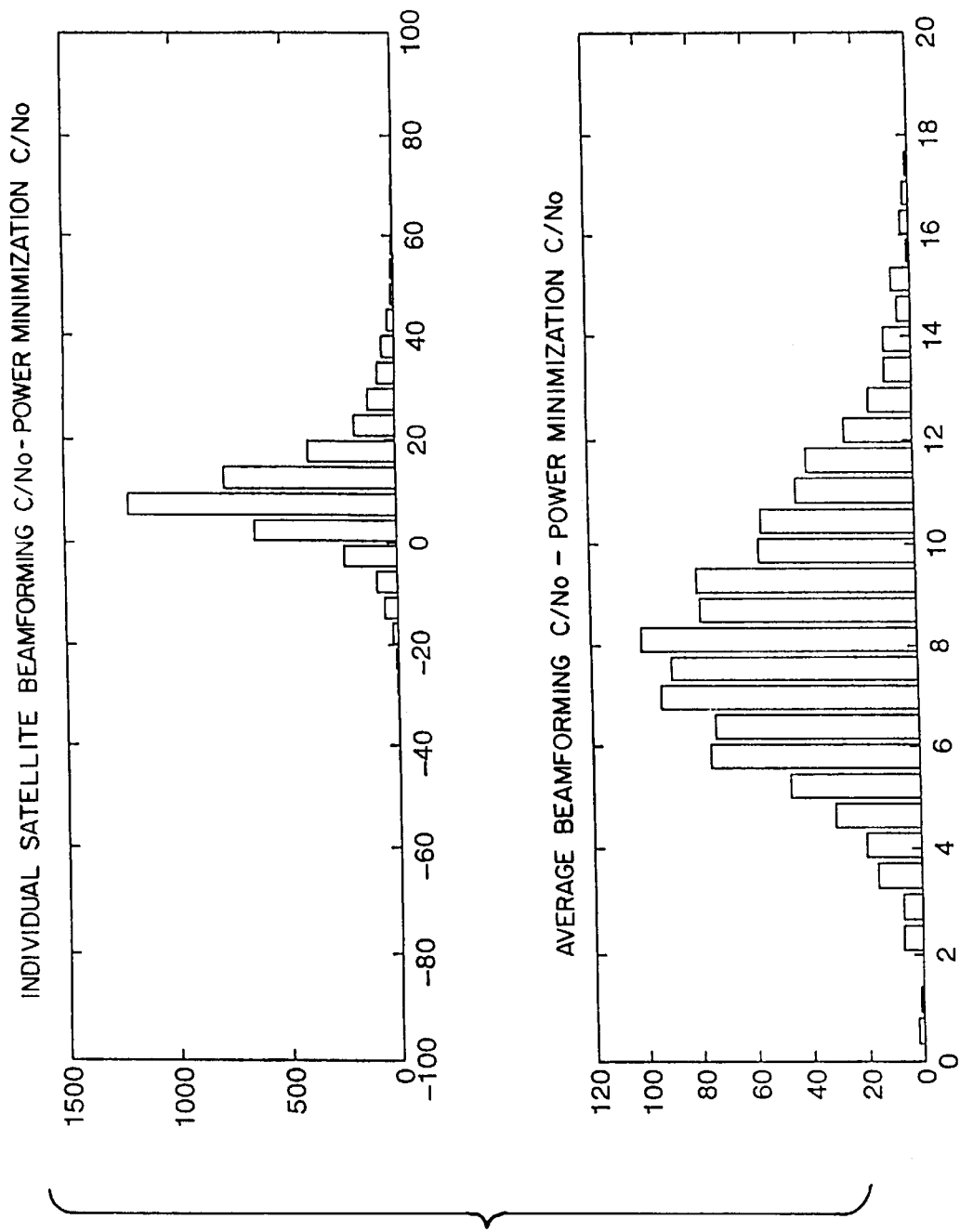

Referring now to FIGS. 3–5, the histograms show the difference between the signal to noise ratio (SNR) achieved using a known power minimization algorithm compared to the SNR achieved using the present beam forming approach described above. The top frame of each of the figures are obtained on a satellite by satellite basis, while the bottom frame of each of the figures is obtained based on the average of the four satellites in each geometry. As shown, the present beam forming approach is significantly superior to the known power minimization or simple null steering techniques.

Figure 6:
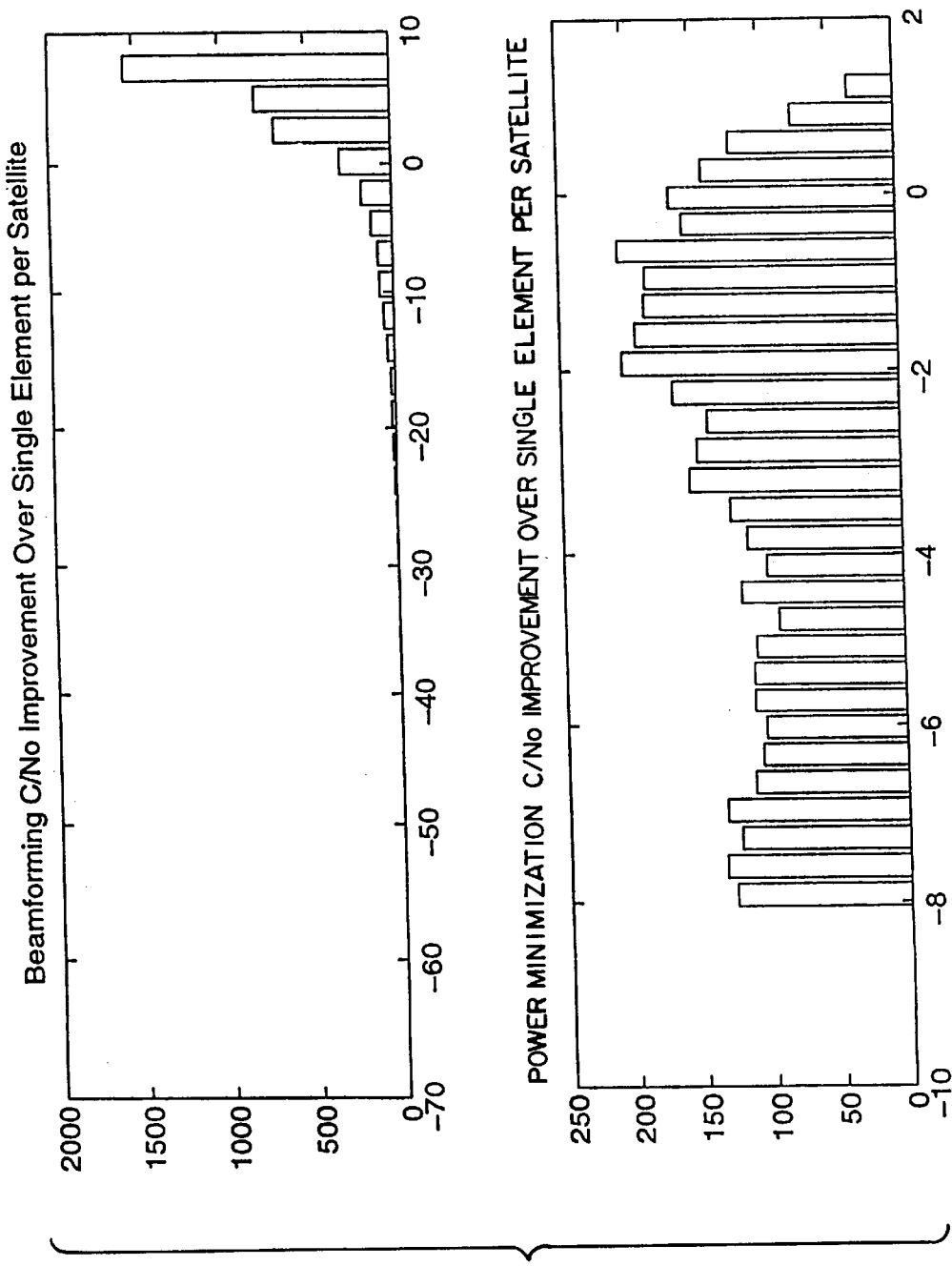
FIGS. 6–8 are histograms where the upper frame of each figure depicts an improvement in the signal-to-noise ratio (C/N$_0$) using an embodiment of the present inventive method with an antenna array, compared to the signal-to-noise ratio obtained using a single antenna element. The lower frame of each figure depicts the signal-to-noise ratio obtained using known power minimization techniques for an antenna array compared to the signal-to-noise ratio obtained using a single element antenna. The jammer-to-signal (J/S) ratio in FIGS. 6, 7, and 8 is 25 dB, 50 dB, and 100 dB, respectively.
Figure 7:
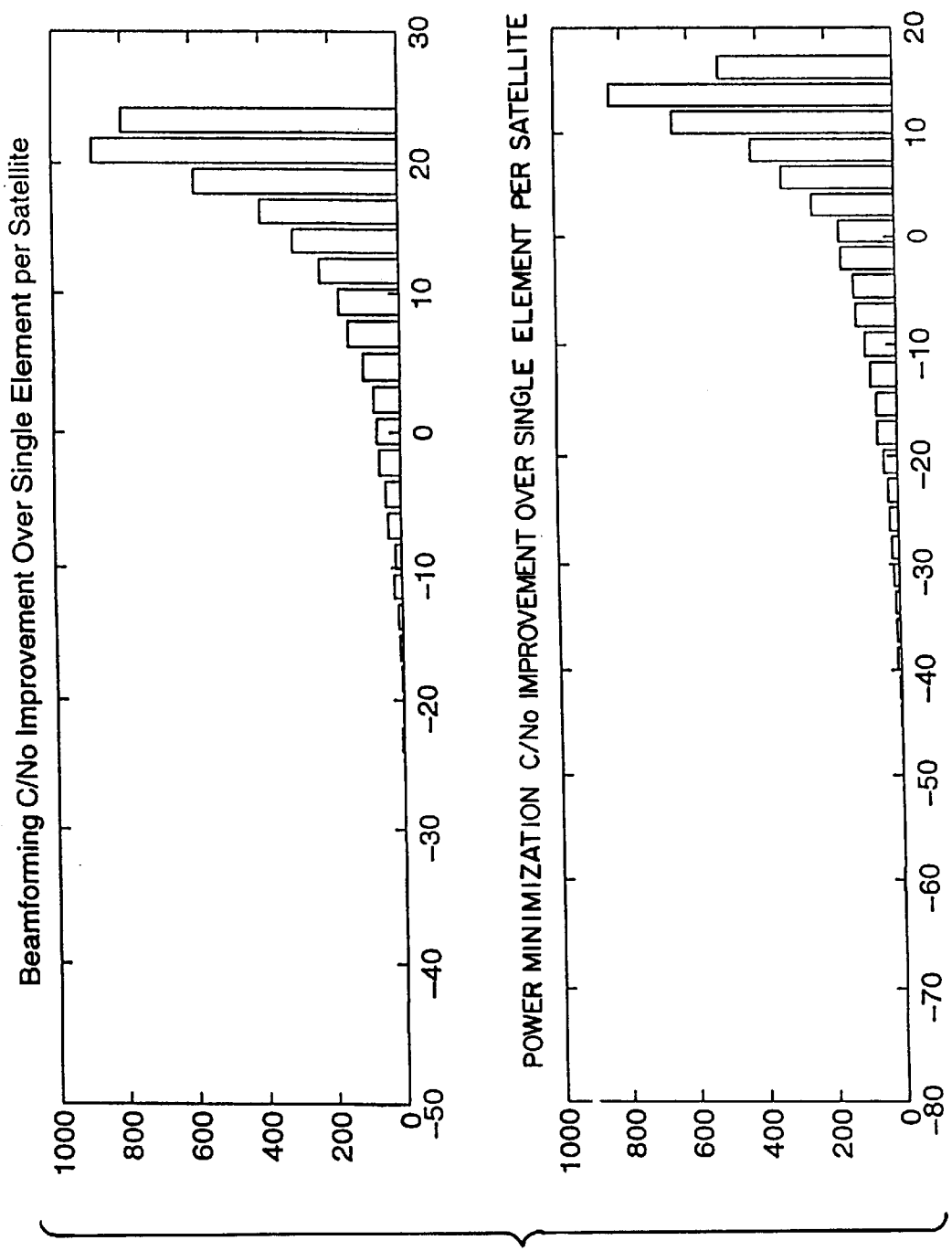
Figure 8:
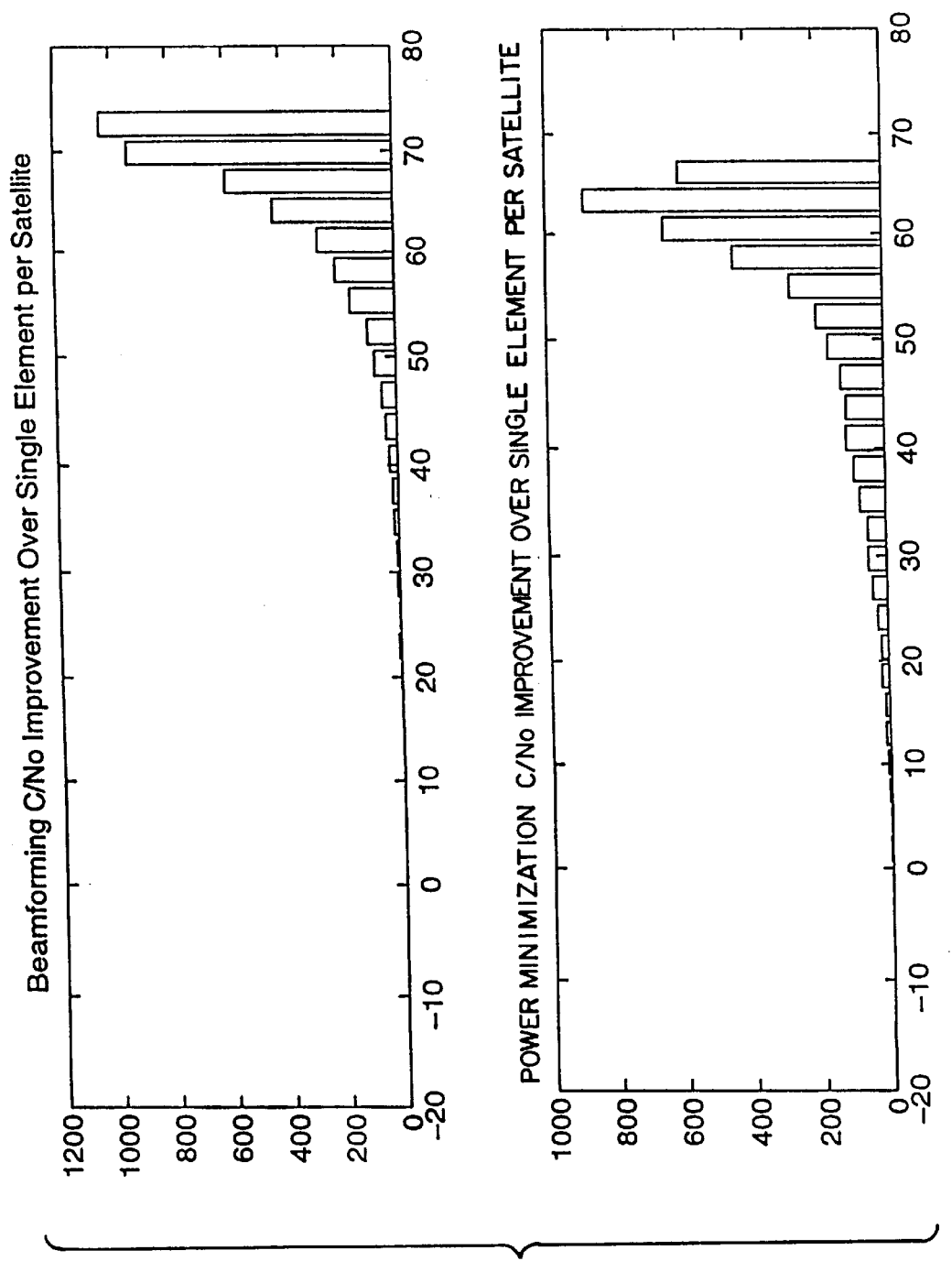

Referring now to FIGS. 6–8, the histograms shown in the figures illustrate the advantages of the present beam forming technique (using multiple antenna elements) and power minimization or null steering techniques (using multiple antenna elements), compared to a single element antenna obtained on a per satellite basis. Of course, the amount of benefit obtained depends on the amount of jamming that is present. This is to be expected because the strength of the present spatial nulling technique is based on steering nulls in the direction of the jammer signals, rather than nulling thermal noise. When jamming signal levels are low, use of known power minimization techniques are detrimental to the signal to noise ratio, and such techniques should not be used. In contrast, the present beam forming technique provides an improvement over the full range of jamming signal strengths.

Figure 9:
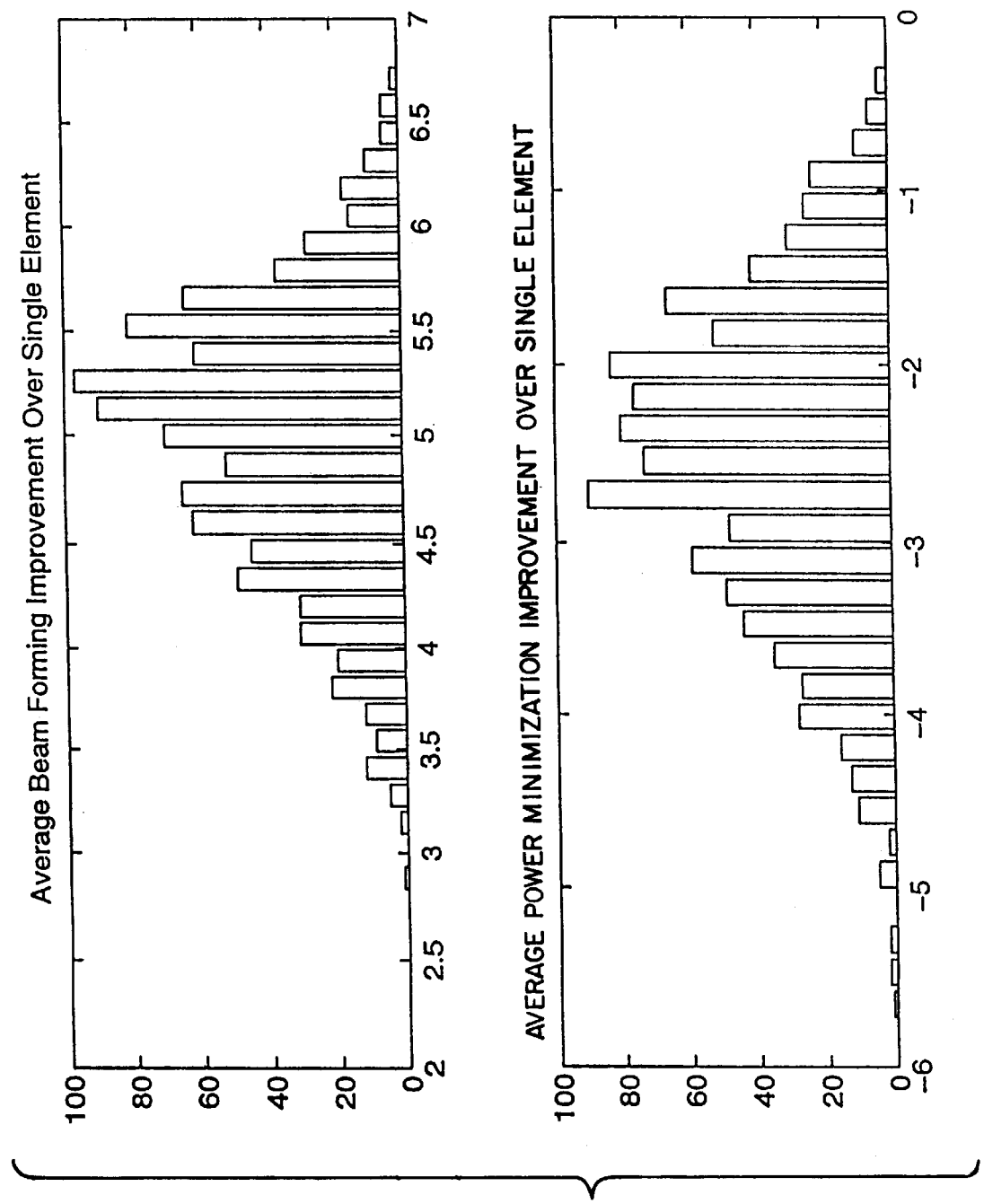
FIGS. 9–11 are histograms where the upper frame of each figure depicts an improvement in the average signal-to-noise ratio (C/N$_0$) using the present inventive method with an antenna array, compared to the signal-to-noise ratio obtained using single antenna element. The lower frame of each figure depicts the average the signal-to-noise ratio obtained using known power minimization techniques for an antenna array compared to the signal-to-noise ratio obtained using a single element antenna. The jammer-to-signal (J/S) ratio in FIGS. 9, 10, and 11 is 25 dB, 50 dB, and 100 dB, respectively.
Figure 10:
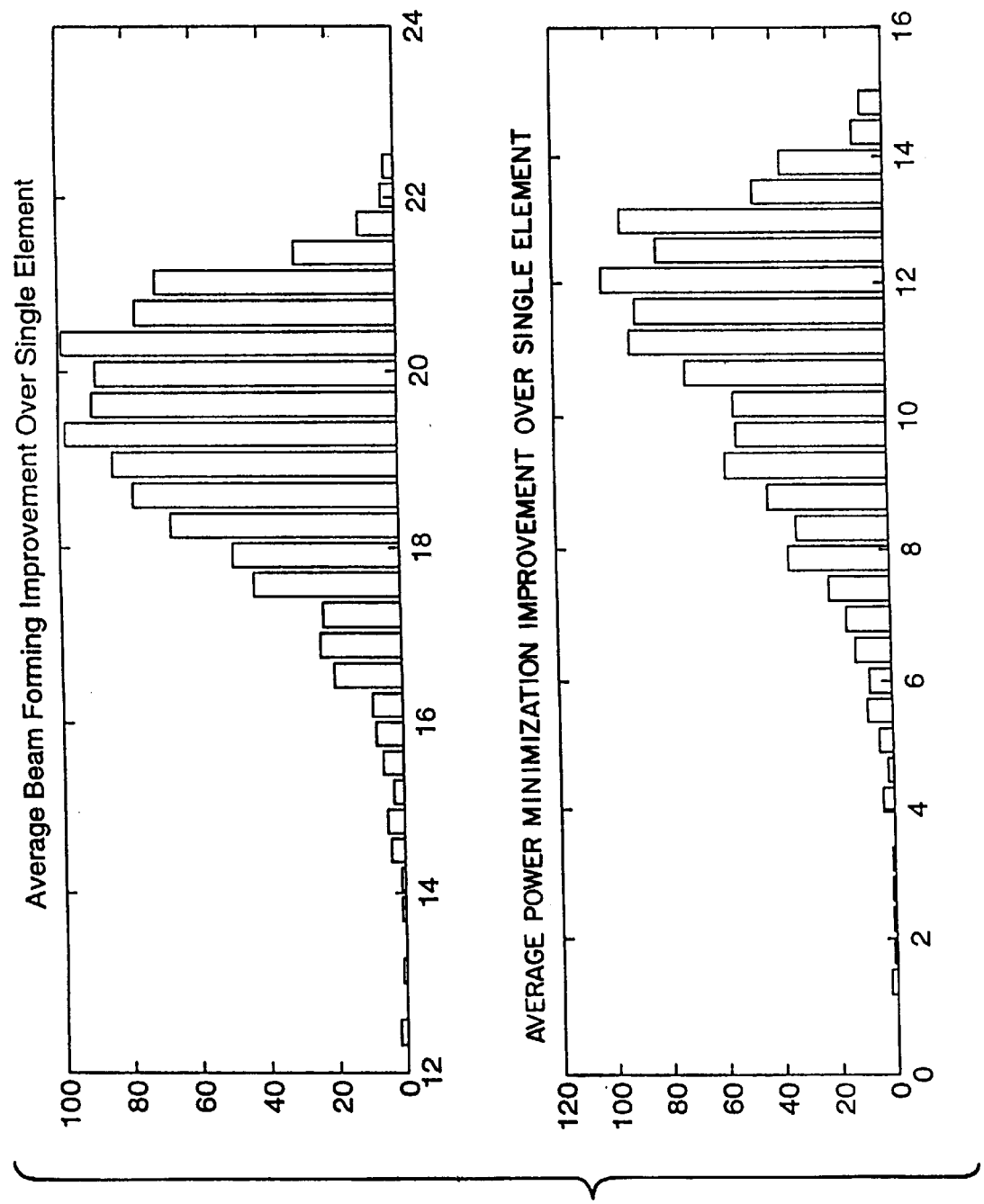
Figure 11:
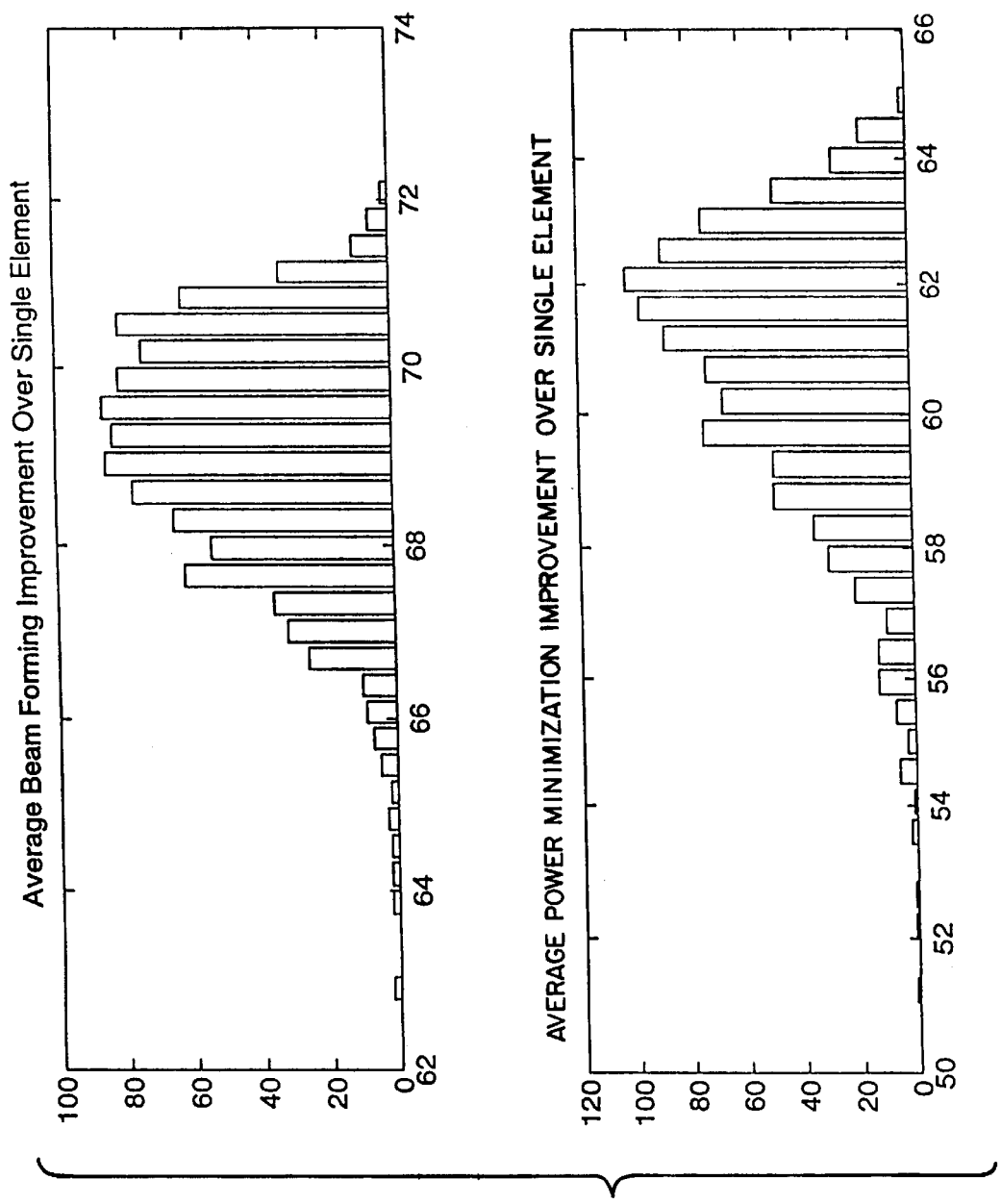

Referring now to FIGS. 9–11, the histograms show the improvement in the average signal to noise ratio over a single element antenna for the beam forming and for known power minimization techniques. As shown in the figures, known power minimization techniques disadvantageously permit the signal to noise ratio to drop to a level lower than it would normally be when using a single element antenna. This occurs when jamming levels are low. As shown in the histograms, the present beam forming technique does not permit this anomaly to occur. Note that FIGS. 3–11 involve matrix inversion techniques for both power minimization and beam forming techniques.

Figure 12:
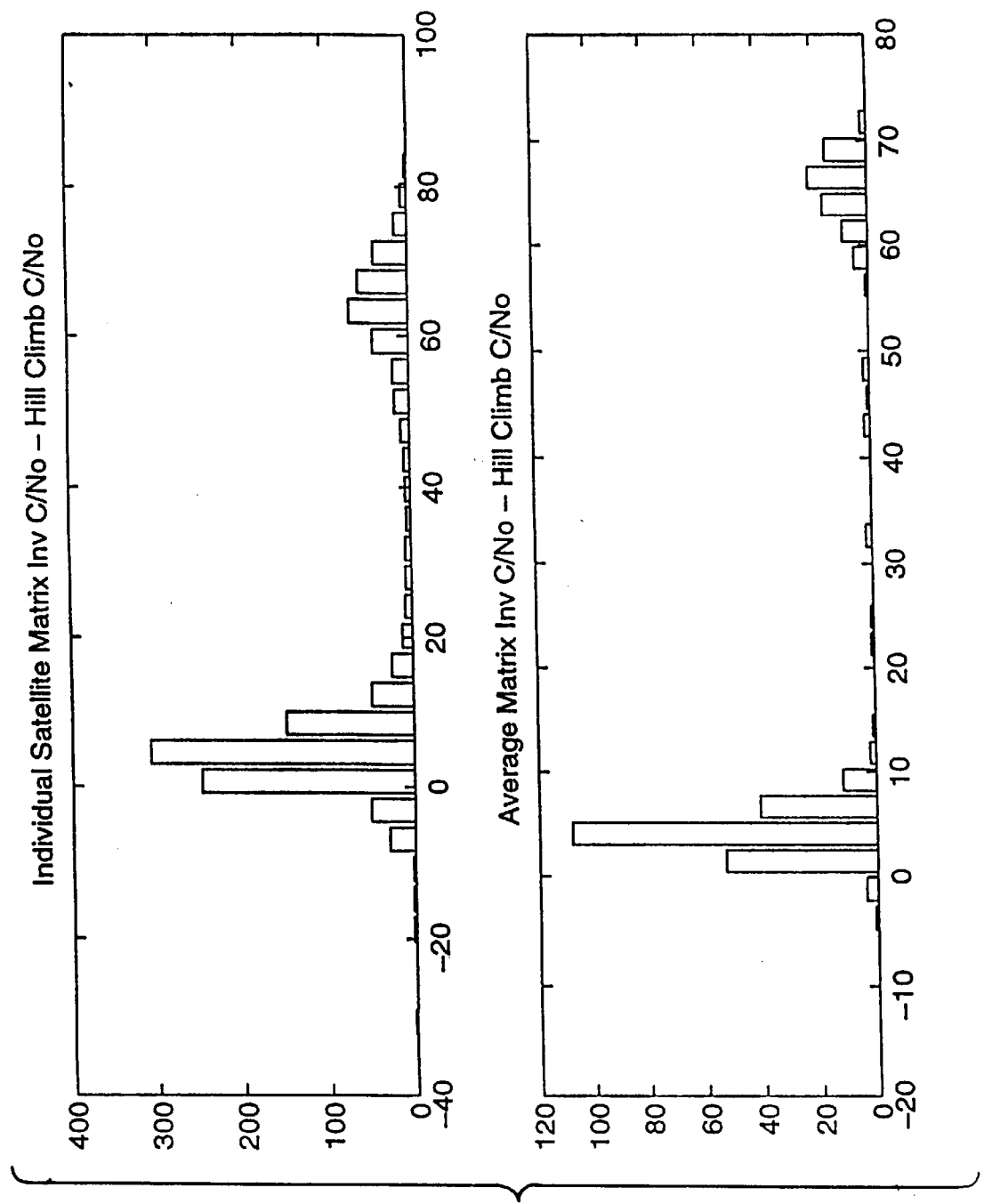
FIG. 12 is a histogram where the upper frame shows the difference in performance between a matrix inversion approach compared to a hill climbing approach on a per satellite basis. The lower frame shows the difference in performance between a matrix inversion approach compared to a hill climbing approach for the average of four satellites. The jammer-to-signal (J/S) ratio is 100 dB.

Referring now to FIG. 12, the histograms show the difference in signal to noise ratio levels between a matrix inversion approach and a hill climbing approach. The top frame of the figure represents a per satellite approach while the bottom frame of the figure represents an average of four satellites in each geometry.

Figure 13:
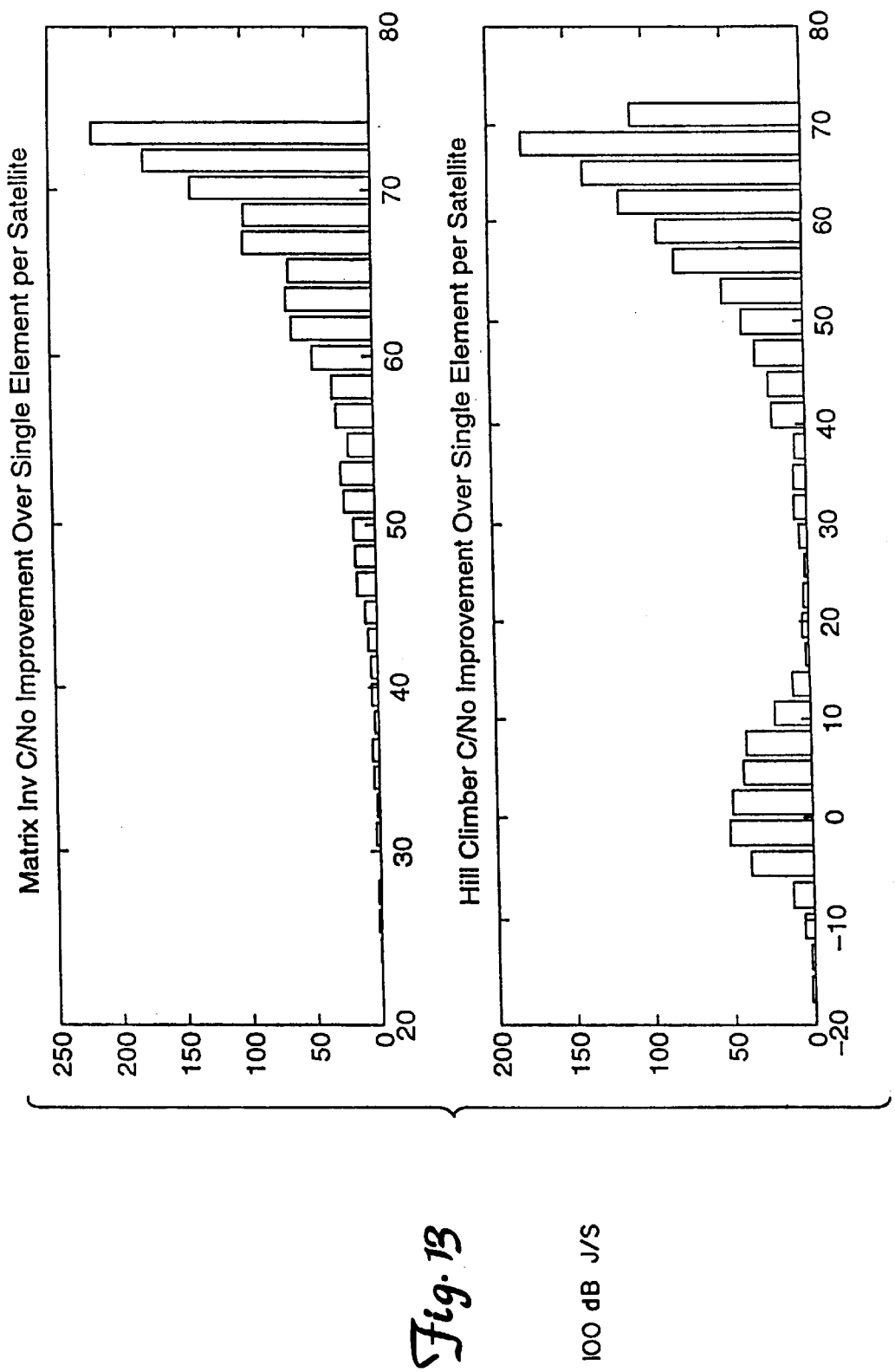
FIG. 13 is a histogram where the upper frame shows the difference in signal to noise ratio obtained using a matrix inversion technique with an antenna array, compared to the signal to noise ratio obtained using a single antenna element, taken on a per satellite basis. The lower frame shows the difference in signal to noise ratio obtained using a hill climbing technique with an antenna array, compared to a single antenna element, taken on a per satellite basis. The jammer-to-signal (J/S) ratio is 100 dB.

Referring now to FIG. 13, the histogram illustrates the improvement in signal to noise ratio using the matrix inversion technique and the hill climbing technique over a single element antenna, on a per satellite basis.

Figure 14:
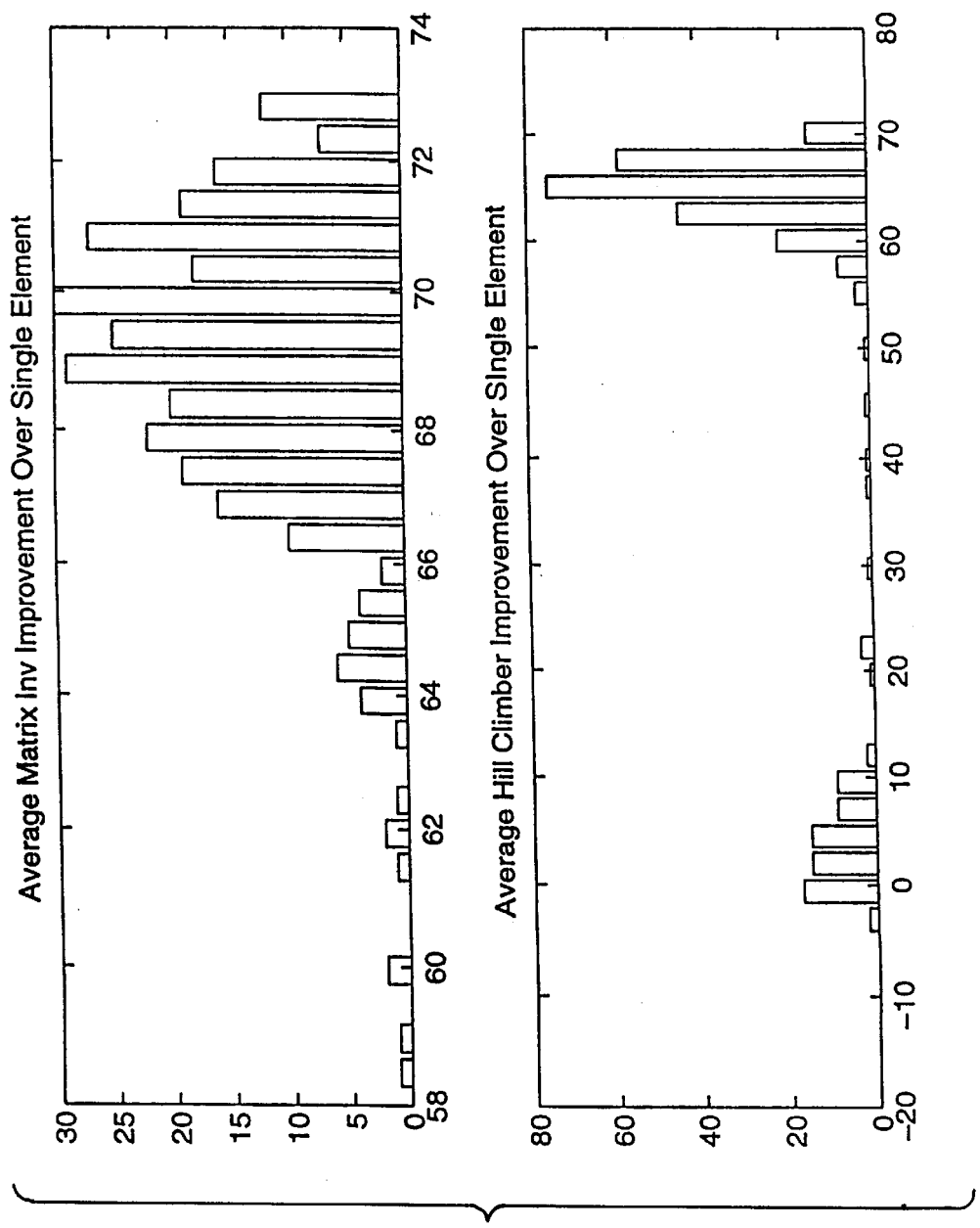
FIG. 14 is a histogram where the upper frame shows the difference in signal to noise ratio obtained using a matrix inversion technique with an antenna array, compared to the signal to noise ratio obtained using a single antenna element, taken over an average of four satellites. The lower frame shows the difference in signal to noise ratio obtained using a hill climbing technique with an antenna array, compared to a single antenna element, taken over an average of four satellites. The jammer-to-signal (J/S) ratio is 100 dB.

Referring now to FIG. 14, the histogram shows the improvement in signal to noise ratio using the matrix inversion technique and the hill climbing technique over a single element antenna based on the average of the four satellites in each geometry.

As shown in the above figures, use of the hill climbing technique in the present inventive method typically attains results within three to five decibels of an optimal level. Occasionally, the hill climbing technique may be come "stuck" at a local maximum. However, in practice, the hill climbing technique does not terminate, and changing conditions would obviate this problem by overcoming the local maximum condition.

Specific embodiments of a method and apparatus for reducing jamming using beam forming with navigational data according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method of nulling jamming signals in a receiving system adapted to receive signals from a plurality of transmitting sources and to provide weighted signals in response, the receiving system having an antenna array with a plurality of antenna elements with a weight adjustment for each element, the method comprising the steps of:
   a) determining the value of weights corresponding to each antenna element;
   b) obtaining navigational data representing the orientation of the antenna array;
   c) estimating a signal to noise ratio for each of the plurality of transmitting sources using the navigational data;
   d) iteratively and continuously adjusting the weights to obtain a greatest average value of all of the signal to noise ratios estimated for all of the plurality of transmitting sources; and
   e) continuously repeating steps (a) through (d).

2. The method according to claim 1 wherein a single weight value corresponds to a signal antenna element, the antenna elements corresponding to a set of weights such that a single set of weights is optimized for the plurality of transmitting sources.

3. The method according to claim 1 wherein the value of each weight is adjusted with respect to at least one of phase and amplitude.

4. The method according to claim 1 wherein the receiving system is an analog receiving system.

5. The method according to claim 1 wherein the navigational data is provided by an inertial guidance system associated with the receiving system.

6. The method according to claim 1 wherein the weights are adjusted to obtain the greatest value of the signal to noise ratio to permit spatial nulls to be steered in the direction of the jammers.

7. The method according to claim 1 wherein the weights are adjusted to obtain the greatest value of the signal to noise ratio to permit gain to be steered in a direction corresponding to each transmitting source.

8. The method according to claim 6 wherein the receiving system steers multiple spatial nulls in the direction of jammers for a plurality of jammers up to a limit of one less than the number of antenna elements in the antenna array.

9. The method according to claim 1 wherein use of the navigational data prevents steering spatial nulls in the direction of the transmitting sources.

10. The method according to claim 1 wherein the step of adjusting the weights includes the step of a coarse adjustment of the weights, until a preferred coarse step is obtained, followed by the step of fine adjustment of the weights within the coarse step.

11. A method of reducing jamming in a global positioning system (GPS) satellite receiving system, the receiving system having an antenna array with a plurality of antenna elements with a weighted adjustment for each element, the method comprising the steps of:
   a) selecting an initial weight value corresponding to each antenna element;

b) providing a weight adjustment scheme for adjusting the weights;

c) measuring a power output of the antenna array;

d) obtaining navigational data representing the orientation of the array;

e) estimating a gain of the antenna array for each of a plurality of tracked GPS satellites, basing the estimations on the navigational data to provide an indication of the orientation of the array relative to each of the plurality of tracked GPS satellites;

f) estimating power levels of received signals corresponding to each of the plurality of tracked GPS satellites;

g) solving for an average signal to noise ratio for all of the plurality of tracked GPS satellites, using the estimated power level corresponding to each of the plurality of tracked GPS satellites and the estimated gain of the antenna array for each of the plurality of tracked GPS satellites;

h) iteratively and continuously adjusting the weights to obtain a greatest value of the average signal to noise ratio; and i) continuously repeating steps (c) through (h).

12. The method according to claim 11 wherein one weight value corresponds to one antenna element so as to form a set of weights such that the set of weights of optimized for a plurality of GPS satellites.

13. The method according to claim 11 wherein a single weight value corresponds to a signal antenna element, the antenna elements corresponding to a set of weights such that a single set of weights corresponds to the plurality of GPS satellites.

14. The method according to claim 11 wherein the value of each weight is adjusted with respect to at least one of phase and amplitude.

15. The method according to claim 11 wherein the receiving system is an analog receiving system.

16. The method according to claim 11 wherein the navigational data is provided by an inertial guidance system associated with the receiving system.

17. The method according to claim 11 wherein adjusting the weights to obtain the greatest value of the signal to noise ratio permits spatial nulls to be steered in the direction of the jammers.

18. The method according to claim 11 wherein adjusting the weights to obtain the greatest value of the signal to noise ratio permits gain to be steered in a direction corresponding to each GPS satellite.

19. The method according to claim 17 wherein a maximum number spatial nulls steered in the direction of the jammers is equal to one less than the number of antenna elements in the antenna array.

20. The method according to claim 11 wherein use of the navigational data prevents steering of spatial nulls in the direction of the GPS satellites.

21. An apparatus for reducing jamming in a global positioning system (GPS) satellite receiving system, the apparatus comprising:

an antenna array having a plurality of antenna elements, each antenna element having a weight associated with it;

means for adjusting a set of weights such that each weight in the set of weights corresponds to one antenna element weight;

means for obtaining navigational data representing the orientation of the array;

means for measuring a power output from the antenna array;

means for estimating an average gain of the antenna array for each of a plurality of tracked GPS satellites, basing the estimation on the navigational data to provide an indication of the orientation of the array relative to each of the plurality of tracked GPS satellites;

means for estimating power levels of received signals corresponding to each of the plurality of GPS satellites;

means for calculating a signal to noise ratio for each of the plurality of tracked GPS satellites, using the estimated power levels and the estimated average gain of the antenna array corresponding to the plurality of tracked GPS satellites; and means for iteratively adjusting the weights to obtain a greatest value of an average of the signal to noise ratios of the plurality of tracked GPS satellites.

22. An apparatus for receiving satellite signals and reducing jamming signals comprising:

a global positioning system (GPS) satellite receiver configured to receive signals from a plurality of satellites;

an antenna array having a plurality of antenna elements, the array operatively coupled to the receiver;

a plurality of weight values, each value corresponding to an antenna element;

a processor configured to adjust the weight values;

a power detector operatively coupled between the antenna array and the processor configured to measure an average power output of the antenna array;

a navigational system coupled to the processor configured to supply navigational data representing an orientation of the array;

the processor configured to calculate a gain of the antenna array for each of the plurality of satellites using the navigational data to provide an indication of the orientation of the array relative to each of the plurality of satellites, the processor estimating a signal to noise ratio for each of the plurality of satellites using estimated power levels corresponding to each of the plurality of satellites such that the value of the weights are adjusted to obtain a greatest value of an average of the signal to noise ratios for all of the plurality of satellites.

* * * * *